United States Patent
Orsi Mazzucchelli

(10) Patent No.: US 8,783,860 B2
(45) Date of Patent: Jul. 22, 2014

(54) MATERIAL BASED ON CELLULOSE ACETATE WITH PLASTICISERS AND MANUFACTURED ARTICLE PRODUCED THEREWITH

(75) Inventor: Davide Orsi Mazzucchelli, Varese (IT)

(73) Assignee: Mazzucchelli 1849 S.p.A., Castiglione Olona Va (IT)

( * ) Notice: Subject to any disclaimer, the term of this patent is extended or adjusted under 35 U.S.C. 154(b) by 13 days.

(21) Appl. No.: 13/808,394

(22) PCT Filed: Jul. 4, 2011

(86) PCT No.: PCT/IB2011/052949
§ 371 (c)(1),
(2), (4) Date: Feb. 21, 2013

(87) PCT Pub. No.: WO2012/004727
PCT Pub. Date: Jan. 12, 2012

(65) Prior Publication Data
US 2013/0169921 A1    Jul. 4, 2013

(30) Foreign Application Priority Data
Jul. 5, 2010   (IT) .............................. MI2010A1237

(51) Int. Cl.
*G02C 1/00*    (2006.01)
*C08L 3/02*    (2006.01)
(52) U.S. Cl.
USPC ............................................. 351/41; 524/37

(58) Field of Classification Search
USPC ........................ 351/41; 524/37, 35, 27, 38, 39
See application file for complete search history.

(56) References Cited

U.S. PATENT DOCUMENTS

| 2,109,593 | A | 3/1938 | Macht et al. |
| 2,597,098 | A | 5/1952 | Richard |
| 2,617,737 | A | 11/1952 | Stern |
| 5,376,708 | A | 12/1994 | Best et al. |
| 6,313,202 | B1 * | 11/2001 | Buchanan et al. .............. 524/37 |
| 6,977,275 | B2 * | 12/2005 | Buchanan et al. .............. 524/37 |

FOREIGN PATENT DOCUMENTS

EP    1 057 858 A2    12/2000

OTHER PUBLICATIONS

International Search Report, dated Oct. 7, 2011, from corresponding PCT application.

* cited by examiner

*Primary Examiner* — Hung Dang
(74) *Attorney, Agent, or Firm* — Young & Thompson

(57) ABSTRACT

A plastic material based on cellulose acetate, including at least one plasticizer, in which the plasticizer includes a mixture of a first plasticizer including citric acid esters and at least one second plasticizer selected from the group of organic phosphates, glycerol esters and trimellitic acid esters, the content of the first plasticizer being equal to or greater than the second plasticizer and the aforementioned mixture of plasticizers constituting overall 25-35% by weight of the plastic material.

16 Claims, 2 Drawing Sheets

MATERIAL BASED ON CELLULOSE ACETATE WITH PLASTICISERS AND MANUFACTURED ARTICLE PRODUCED THEREWITH

FIELD OF THE INVENTION

This invention concerns a material based on cellulose acetate with plasticisers, in particular such a material adapted for use in the field of eyewear and jewelry and related products made therewith.

PRIOR ART

Cellulose acetate is a product that has been used industrially since the beginning of the 1900s. The first applications related to films, lacquers and yarns. The manufactured articles for which most production of cellulose acetate takes place nowadays include cigarette filters and fibres for weaving.

To a certain extent, the production of cellulose acetate is aimed at sectors in which it is used as a transparent thermoplastic material, to produce articles with exceptional transparency that can be easily coloured and have good mechanical properties. Although it is more expensive than polymers that have appeared on the market more recently, this thermoplastic material still occupies niche markets where it is exploited in specific mixtures that enhance its properties of anti-ageing, transparency, impact strength, chemical and solvent resistance and pleasant feel. A few examples of applications in these niche markets are the eyewear field (frames for spectacles and goggles, visors and lenses for face-guards etc.) and jewelry, on which the following description focuses, in addition to a series of other small accessories or components in various industries, including the automotive and furniture industries.

Most of these applications use cellulose acetate in which on average 2.2-2.4 hydroxyl groups per unit of glucose are acetylated.

For use as a thermoplastic material, especially in applications where it is wished to exploit the plastic features in order to create unusual chromatic/aesthetic effects (for example, objects made from slabs cut from block), cellulose acetate has plasticisers added, to lower its softening temperature and thereby allow plastic processing at temperatures below the melting point, at which partial decomposition and formation of dark colours can occur. The plasticisers used must obviously be compatible with cellulose acetate in significant quantities, they must remain stable over time in the manufactured article, in order to give it a reasonable life, they must be and remain colourless (so as not to influence the chromatic yield of the pigments chosen) and they must not cause acidity to build up.

It is known that the following can be used as plasticisers: phthalates (dimethyl phthalate, diethyl phthalate, dibutyl phthalate, butyl benzyl phthalate), trimellitates (trimethyl trimellitate, triethyl trimellitate and tributyl trimellitate), esters of orthophosphoric acid (triphenyl phosphate, tricresyl phosphate, ethylhexyl diphenyl phosphate, isodecyl diphenyl phosphate), citrates (triethyl citrate, acetyl triethyl citrate, acetyl tributyl citrate), benzoates (diethylene glycol dibenzoate, dipropylene glycol dibenzoate), adipates (dimethyl adipate), tartrates, oleates, sebacates, azelates, ricinoleates, glycerol esters (glyceryl triacetate, known commercially as triacetin and glyceryl tripropionate, known commercially as tripropionin) among others.

Not all the plasticisers and families of plasticisers listed are sufficiently compatible with cellulose acetate or have sufficient plasticising power. For example, in order for some citrates to achieve sufficient plasticisation and lower the softening temperature of cellulose acetate sufficiently, they must be added in such a high quantity that they impair the mechanical properties of the finished product and make it unusable in some applications, such as those of interest for this patent application. Furthermore, it has been seen that some of these, e.g. citrates, cannot be used industrially because they bring about unwanted colouring of the semifinished product, unless high degrees of purity are chosen (which, however, increases costs).

In particular, in the field of production of slabs cut from block or made by extrusion (for articles of eyewear and jewelry), the most commonly used plasticiser is diethyl phthalate (DEP).

However, specifically when using cellulose acetate with plasticisers for the manufacture of spectacle frames, the use of diethyl phthalate is not completely satisfactory. In fact, it has been found that DEP tends to migrate from the cellulose acetate to some other plastic materials placed in close contact, including in particular polycarbonate, which is a material used in several components of eyewear, typically for manufacturing unbreakable spectacle lenses. Therefore it is not possible to use polycarbonate lenses in frames made of cellulose acetate to which diethyl phthalate has been added as a plasticiser, because this plasticiser would over time migrate into the lens, making it opaque and causing the formation of cracks. The same problem arises in the opposite case, where polycarbonate components are to be used together with lenses or visors made of cellulose acetate (for example in face-guards and goggles for sporting activities or for personal protection or in the visors of protective helmets).

Other plasticisers that can be used generically with products based on cellulose acetate are described in the documents U.S. Pat. No. 5,376,708, EP 1,057,858 and U.S. Pat. No. 2,109,593. However, the suggestions given in these documents do not apply directly in the context of this invention, which concerns a specific application in the field of eyewear and jewelry, which has special, stringent requirements.

The Applicant has instead set itself the objective of identifying a plastic material based on cellulose acetate and a selection of plasticisers which, in suitable proportions, result in good mechanical performance of the material, are sufficiently economical in industrial processes, do not impart their own colouring and, above all, do not involve problems of migration, particularly to a polycarbonate-based material.

BRIEF DESCRIPTION OF THE INVENTION

A first aim of this invention is, therefore, to provide a plastic material based on cellulose acetate with plasticisers that do not involve problems of migration of the plasticisers, and at the same time offer mechanical properties comparable or superior to cellulose acetate with the addition of DEP and at a comparable cost.

Another aim of the invention is to provide such a plastic material based on cellulose acetate that is suitable for processing either as a "block" or following extrusion, for production of semifinished products in bar, slab, coil or other form.

Another aim is to provide a product based on cellulose acetate that is suitable, particularly in the field of eyewear, for use together with materials (such as polycarbonate) that are damaged following because of migration of the plasticiser.

These aims are achieved by a product whose essential features are described in the attached main claims.

Other inventive features are disclosed in the depending claims.

In particular, according to a first aspect of the invention, a plastic material is provided based on cellulose acetate, comprising a plasticiser comprised of the mixture of a first plasticiser comprised of citric acid esters with at least one second plasticiser selected from the group of organic phosphates, glycerol esters and trimellitic acid esters, the content of the first plasticiser being equal to or greater than the second plasticiser and the aforementioned mixture of plasticisers constituting overall 25-35% by weight of said plastic material.

According to an aspect of the invention, said first plasticiser is acetyl triethyl citrate (CTR).

According to a second, preferred aspect, said second plasticiser is chosen from triaryl phosphate, alkyl diaryl phosphate, triphenyl phosphate, ethylhexyl diphenyl phosphate and isodecyl diphenyl phosphate, and is preferably triphenyl phosphate (TPP).

According to a preferred, alternative aspect, said second plasticiser is chosen from trimethyl trimellitate (TMTM) and triethyl trimellitate.

According to yet another alternative aspect, said second plasticiser is chosen from glyceryl triacetate and glyceryl tripropionate.

A particular aspect of the invention provides that, within said mixture of plasticisers, said first plasticiser amounts to 60-70% by weight and said second plasticiser is an organic phosphate or a glycerol ester amounting to 40-30% by weight.

Alternatively, within said mixture of plasticisers, said first plasticiser amounts to 60-85% by weight and said second plasticiser is a trimellitic acid ester amounting to 40-15% by weight.

According to another aspect, the invention provides a spectacle frame comprising, at least in part, a material based on cellulose acetate with plasticisers as set forth above. In particular, it provides spectacles comprising the aforementioned frame and lenses made of a polycarbonate-based material.

According to a further aspect, the invention provides a lens for spectacles/goggles or face-guards, or a support plate or cover for a device containing electronic components, comprising at least in part a material based on cellulose acetate with plasticisers, as indicated above.

BRIEF DESCRIPTION OF THE DRAWINGS

Further features and advantages of the product and the manufactured article according to the invention will become more clearly apparent from the following detailed description of preferred embodiments, given by way of example and illustrated with the help of the attached drawings, in which.

DETAILED DESCRIPTION OF PREFERRED EMBODIMENTS

Figure 1:
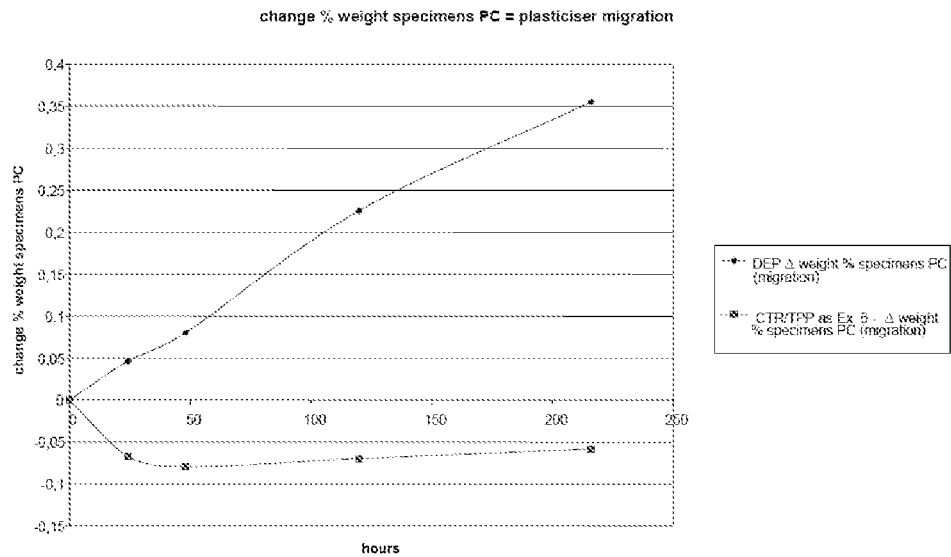
FIG. 1 is a graph showing comparative curves, with DEP plasticiser and CTR/TPP, of the percentage increase in weight (migration) of a sample of polycarbonate placed in contact with a specimen of cellulose acetate with the addition of plasticiser.

On the basis of its own research, the applicant has been able to determine that a suitable material for achieving the aims mentioned above is a material based on cellulose acetate—in which, preferably an average of 2.2-2.4 hydroxyl groups per unit of glucose are acetylated—with the addition of a mixture of plasticisers comprising a first component constituted by citric acid esters and a second component chosen from the group constituted by organic phosphates, glycerol esters and trimellitic acid esters, the content of the first component being greater than or equal to that of the second component. The content of the two-component mixture of plasticisers in the overall cellulose acetate/plasticiser mass amounts to 25-35% by weight; this quantity is referred to below for concision as "degree of plasticisation".

It has been found that this specific combination of plasticisers, in the percentage ratios indicated below, constitutes the ideal mixture of plasticisers for cellulose acetate when this material is used specifically in the eyewear sector (frames, face-guards, lenses, visors etc.) and in the similar sector of jewelry. The material produced thereby has indeed excellent mechanical and aesthetic properties, an absence (or negligible presence) of migration into polycarbonate, negligible colouring of its own, low overall volatility—and therefore substantial stability of the product—as well as acceptable raw material and process costs.

In particular, the two components used as a plasticiser for the material according to the invention are constituted by citric acid esters—such as acetyl trialkyl citrate, and preferably acetyl triethyl citrate (CTR) or acetyl tributyl citrate—and organic phosphates—such as triaryl phosphate and alkyl diaryl phosphate, preferably triphenyl phosphate (TPP), ethylhexyl diphenyl phosphate and isodecyl diphenyl phosphate—or glycerol esters—preferably glyceryl triacetate and glyceryl tripropionate—or else trimellitic acid esters—such as trimethyl trimellitate and triethyl trimellitate, preferably trimethyl trimellitate (TMTM).

The mixture of plasticisers that has given the desired results involves a quantity of the first component of citric acid esters of 50-90% by weight and of the second phosphate component, ester of glycerol or trimellitate, of 50-10%. In particular, the most preferred mixtures involve quantities of the two components within the range 60-70% of citrate and 40-30% of organic phosphate or of glycerol esters or else 60-85% citrate and 40-15% trimellitic acid esters.

A few examples of materials according to the invention, produced by extrusion or from block are given below, as well as a few comparative examples. Afterwards, the technical characteristics obtained on specimens obtained from the material according to the invention will be disclosed, also by comparison with comparative examples from the known art.

Extruded Material and Citrate/Phosphate or Citrate/Triacetin Plasticiser

Example 1

Laboratory Test No. 32, Corresponding to the 65/35 CTR/TPP Composition, and 28% Degree of Plasticisation In a laboratory mixer 2160 g powdered cellulose acetate with a 39.8% degree of acetylation were mixed with 546 g acetyl triethyl citrate (CTR) and 294 g triphenyl phosphate. The material was brought up to 60° C. and mixed in the mixer for 3 hours. After cooling at room temperature the mixture was in the form of a free-flowing powder and was passed through a hopper into a single-screw extruder. The jacket of the extruder was heated to approx. 210° C. and had a die with 2-mm diameter holes at the head. The melted material in the extruder cylinder was expelled from the die at the extruder head in the form of yarns that were cut into pellets approximately 2 mm long.

Example 2

Laboratory Test No. 4, Corresponding to the 68/32 CTR/TPP Composition, and 28% Degree of Plasticisation Example no. 1 was repeated with the same procedures, but the following quantities of materials were used: 2160 g powdered cellulose acetate with a 39.8% degree of acetylation, 570 g acetyl triethyl citrate and 270 g triphenyl phosphate.

Example 3

Laboratory Test No. 53, Corresponding to the 65/35 CTR/TPP Composition, and 31% Degree of Plasticisation Example No. 1 was repeated with the same procedures, but the following quantities of materials were used: 2070 g powdered cellulose acetate with a 39.8% degree of acetylation, 604.5 g acetyl triethyl citrate and 325.5 g triphenyl phosphate.

Example 4

Laboratory Test No. 21, Corresponding to the 60/40 CTR/TPP Composition, and 28% Degree of Plasticisation Example No. 1 was repeated with the same procedures, but the following quantities of materials were used: 2160 g powdered cellulose acetate with a 39.8% degree of acetylation, 504 g acetyl triethyl citrate and 336 g triphenyl phosphate.

Example 5

Laboratory Test No. 65, Corresponding to a 65/35 CTR/EDPP Composition, and 28% Degree of Plasticisation Example No. 1 was repeated with the same procedures, but triphenyl phosphate was substituted by ethylhexyl diphenyl phosphate (EDPP). The following quantities of materials were used: 2160 g powdered cellulose acetate with a 39.8% degree of acetylation, 546 g acetyl triethyl citrate and 294 g ethylhexyl diphenyl phosphate.

Example 6

Industrial Granulation Test, Corresponding to the 65/35 CTR/TPP Composition, and 28% Degree of Plasticisation Example No. 1 was repeated with the same procedures, but using industrial equipment and methods—rather than laboratory ones—normally used for producing plasticised pellets by traditional methods. The following quantities of materials were used: 144 kg powdered cellulose acetate with a 39.8% degree of acetylation, 36.4 kg acetyl triethyl citrate and 19.6 kg triphenyl phosphate.

Example 6bis

Laboratory Test, Corresponding to the 65/35 CTR/Triacetin Composition, and 28% Degree of Plasticisation Example No. 1 was repeated with the same procedures, but the following quantities of materials were used: 2160 g powdered cellulose acetate with a 39.8% degree of acetylation, 546 g acetyl triethyl citrate and 294 g triacetin.

Comparative Example C1

Laboratory Test No. 5 Representing the Addition of Standard DEP Plasticisers with a 28% Degree of Plasticisation Example No. 1 was repeated with the same procedures, but the following quantities of materials were used: 2160 g powdered cellulose acetate with a 39.8% degree of acetylation, 840 g diethyl phthalate.

Comparative Example C2

Laboratory Test No. 20, Representing an 80/20 CTR/TPP Composition, i.e. Outside the Most Preferred Range Example No. 1 was repeated with the same procedures, but the following quantities of materials were used: 2160 g powdered cellulose acetate with a 39.8% degree of acetylation, 672 g acetyl triethyl citrate and 168 g triphenyl phosphate.

Comparative example C2a

100% Acetyl Triethyl Citrate Plasticiser and 28% Degree of Plasticisation

Example No. 1 was repeated with the same procedures, but the following quantities of materials were used: 2160 g powdered cellulose acetate with a 39.8% degree of acetylation, 840 g acetyl triethyl citrate (CTR). After cooling at room temperature the mixture was in the form of a free-flowing powder and was passed through a hopper into a single-screw extruder. Insufficient plasticisation was achieved and on reheating the extruder jacket to approx. 210° C. it proved very difficult to expel the material from the 2-mm diameter holes on the die head.

Comparative Example C2b

100% Acetyl Triethyl Citrate (CTR) Plasticiser and 30% Degree of Plasticisation Example No. 1 was repeated with the same procedures, but the following quantities of materials were used: 2100 g powdered cellulose acetate with a 39.8% degree of acetylation, 900 g acetyl triethyl citrate (CTR).

Comparative Example C3

Laboratory Test No. 22, Representing a 50/50 CTR/TPP Composition, i.e. Outside the Most Preferred Range Example No. 1 was repeated with the same procedures, but the following quantities of materials were used: 2160 g powdered cellulose acetate with a 39.8% degree of acetylation, 420 g acetyl triethyl citrate and 420 g triphenyl phosphate.

Comparative Example C4

Laboratory Test No. 71, Representing a 65/35 CTR/TPP Composition, with 20% Plasticisation Example No. 1 was repeated with the same procedures, but the following quantities of materials were used: 2400 g powdered cellulose acetate with a 39.8% degree of acetylation, 390 g acetyl triethyl citrate and 210 g triphenyl phosphate.

Using the pellets obtained in examples, 1, 2, 3, 4, 5, 6bis and in the comparative examples C1, C2, C2b, C3 and C4, suitable specimens were produced, by injection moulding, with the mechanical, shape and size characteristics required by the relevant standards. The following mechanical properties were identified for the specimens:

Tensile strength, according to ASTM standard D638
Modulus of elasticity, according to ASTM standard D790
Rockwell hardness, according to ASTM standard D785
Charpy impact strength, according to ISO standard 179

The results of the mechanical property tests carried out on these specimens are shown in Table 1 below.

As it can be seen, the mechanical properties of the materials obtained in examples 1-6bis according to the invention are similar or superior to those of the material obtained according to the prior art, i.e. comparative example C1. In particular, it may be inferred that the plasticiser according to the invention can also give greater surface hardness. Comparative examples C2 and C3, relating to compositions outside the range identified as most preferred according to the invention, give results that are acceptable but not so desirable. It should be noted in particular that excessive amounts of CTR lower the ultimate tensile stress; furthermore, outside the range identified as most preferred, the impact strength performance deteriorates.

Again, it should be noted that with a degree of plasticisation lower than the preferred one, i.e. in comparative example C4 using only 20% by weight of plasticiser, a more rigid and fragile product is obtained.

Comparative example C2b shows that, by using only CTR in a sufficient quantity to obtain plasticisation allowing the material to be extruded satisfactorily (30%), a final product is obtained with a very low modulus of elasticity, which makes it unsuitable for the applications of interest for this patent application.

Further tests were carried out to check the level of volatility of the mixture of plasticisers used in the material according to the invention and, above all, the extent of migration towards polycarbonate.

Tests were carried out on two different types of specimens of plasticised cellulose acetate, obtained from slabs approximately 5 mm thick produced by extruding:

A. pellets of cellulose acetate with plasticisers obtained according to example 6;

B. pellets of cellulose acetate produced by normal industrial methods, with the addition of 28% diethyl phthalate as a plasticiser.

In combination with the specimens of plasticised cellulose acetate, constituted by plates approximately 5 mm thick, specimens of polycarbonate were provided, obtained from a slab approximately 1 mm thick.

TABLE 1

| Example no. | test extrusion no. | plasticiser mixture (relative %) | tensile strength Stress at yield Mpa | tensile strength Ultimate stress Mpa | Strain at yield % | Ultimate elongation % | Modulus of elasticity Mpa | Rockwell hardness R | Charpy impact strength % unbroken % | % <70 KJ/m² % | minimum value KJ/m² |
|---|---|---|---|---|---|---|---|---|---|---|---|
| 1 | 32 | CTR 65-TPP 35 | 35 | 41 | 4.8 | 29 | 1842 | 112 | 80 | 0 | 111 |
| 2 | 4 | CTR 68-TPP 32 | 28 | 37 | 4.9 | 47 | 1730 | 108 | 88 | 0 | 97 |
| 3 | 53 | CTR 65-TPP 35 (plast. 31%) | 28 | 36 | 4.9 | 32 | 1628 | 104 | 100 | 0 | 139 |
| 4 | 21 | CTR 60-TPP 40 | 34 | 35 | 4.4 | 19 | 1789 | 116 | 5 | 0 | 88 |
| 5 | 65 | CTR 65-ethylhexyl diphenyl phosphate (Santicizer 141) 35 | 29 | 36 | 4.3 | 40 | 1503 | 105 | 35 | 0 | 115 |
| 6 | IND | IND CTR 65-TPP 35 | 35 | 49 | 4.6 | 44 | 1772 | 111 | 65 | 0 | 152 |
| 6bis | lab | CTR 65-triacetin 35 | 31 | 46 | 5.2 | 56 | 1587 | 105 | 60 | 0 | 128 |
| C1 | 5 | DEP (average over 6 tests) | 30 | 35 | 3.9 | 29 | 1858 | 96 | 42 | 5 | 65 |
| C2 | 20 | CTR 80-TPP 20 | 31 | 27 | 4.5 | 16 | 1593 | 114 | 15 | 60 | 1 |
| C2b | lab | CTR 100 (plast. 30%) | 27 | 40 | 4.5 | 58 | 1469 | 97 | 56 | 0 | 172 |
| C3 | 22 | CTR 50-TPP 50 | 34 | 37 | 4.5 | 25 | 1891 | 117 | 45 | 35 | 4 |
| C4 | 71 | CTR 65-TPP 35 (plast. 20%) | 53 | 58 | 6.4 | 20 | 2698 | 118 | 10 | 70 | 2 |

The specimens of cellulose acetate with plasticisers and the specimens of polycarbonate were sandwiched together and subjected to testing.

In particular, for each of the two compositions A and B, a "polycarbonate/cellulose acetate/polycarbonate" sandwich was prepared, then placed between two metal sheets subjected to a weight of 5 kg, and placed in an oven thermostatically controlled to 70° C. The weight of the specimens of acetate and polycarbonate was determined at the start of the test and after 1, 2, 5 and 9 days.

Table 2 shows the weights of the specimen of cellulose acetate with the addition of DEP and the specimens of polycarbonate in contact therewith.

Table 3 shows the weights of the specimen of cellulose acetate with plasticiser according to the invention, prepared with the material obtained from Example 6 and the specimens of polycarbonate in contact therewith.

TABLE 2 plasticised AC sandwich with DEP

| hours | AC specimen g | PC specimen pair g |
|---|---|---|
| 0 | 15.7153 | 7.1311 |
| 24 | 15.6108 | 7.1344 |
| 48 | 15.5667 | 7.1368 |
| 120 | 15.5162 | 7.1472 |
| 216 | 15.4761 | 7.1564 |

TABLE 3 plasticised AC sandwich from example 6 - CTR/TPP

| hours | AC specimen g | PC specimen pair g |
|---|---|---|
| 0 | 15.3345 | 7.0239 |
| 24 | 15.2741 | 7.0192 |
| 48 | 15.2570 | 7.0183 |
| 120 | 15.2299 | 7.0190 |
| 216 | 15.2110 | 7.0198 |

FIG. 1 shows the same comparison in graph form, i.e. in terms of percentage CHANGE in weight of the specimens of polycarbonate placed in contact, on one hand, with cellulose acetate with the addition of DEP and on the other hand, with cellulose acetate with the addition of the mixture of plasticisers according to the invention. The specimens of polycarbonate in contact with cellulose acetate of the prior art increased in weight because of the migration of DEP into the polycarbonate. The specimens of polycarbonate also became opaque. In contrast, the specimens of polycarbonate placed in contact with the material based on cellulose acetate according to the invention underwent a slight loss of weight in the initial phase (connected with an initial loss of moisture), but did not exhibit any increase in weight owing to the migration of plasticiser from the cellulose acetate to the polycarbonate. This confirmed the excellent performance of the product according to the invention compared with its use in combination or in contact with polycarbonate.

Figure 2:
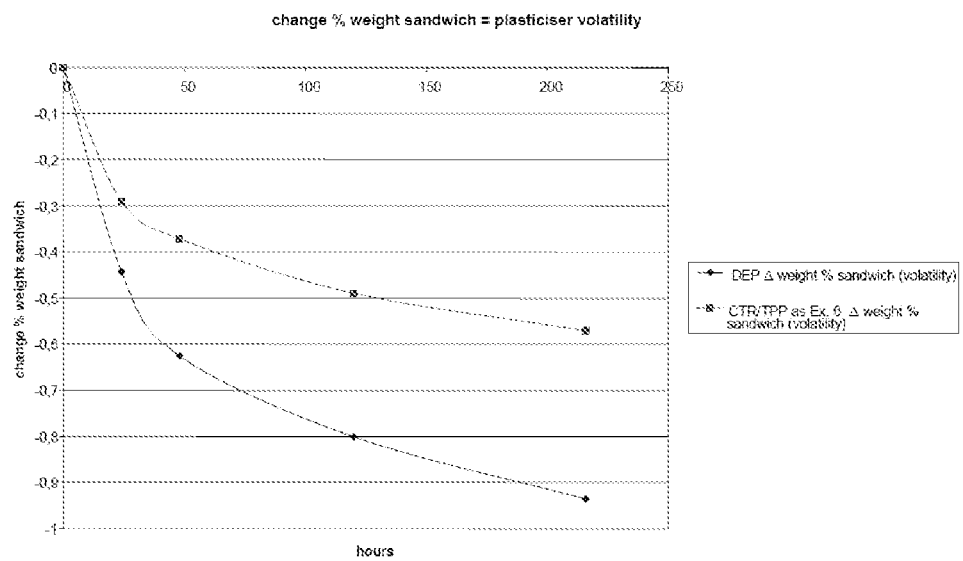
FIG. 2 is a graph showing comparative curves, with DEP plasticiser and CTR/TPP, of the percentage decrease in weight (volatility) attributable to the evaporation of a plasticiser in a specimen of cellulose acetate with the addition of plasticiser.

During the same test, as indicated, the weight losses of the sandwiches were also measured. FIG. 2 shows in graph form the percentage loss in weight of the sandwich owing to the evaporation of the plasticiser (in the initial phase there is a significant influence of the initial loss of weight of the polycarbonate, but this is the same for both types of specimen). FIG. 2 shows that the percentage loss in weight of the material according to the invention is around half the material according to the prior art (i.e. with DEP plasticiser).

Material Cut from Block and Citrate/Phosphate Plasticiser

Example 7

Laboratory Test "Block 12", Corresponding to the 70/30 CTR/TPP Composition, and 28% Degree of Plasticisation In a laboratory mixer, 5.04 kg powdered cellulose acetate with a 39.8% degree of acetylation were mixed with 1.37 kg acetyl triethyl citrate, 0.59 kg triphenyl phosphate and 3.0 kg solvent. The material was brought up to approx. 100° C. and mixed in the mixer for around ½ hour. The paste obtained thereby was shaped into a block approx. 40×20 cm in section, in a press heated at 90° C. for around 2 hours. After cooling, the block was cut into slabs 6 mm thick, which were then dried to eliminate the solvent.

The specimens for the mechanical characterisation tests were cut directly from the slabs obtained, in a similar manner to that indicated for the preceding mechanical tests.

Example 8

Laboratory Test "Block 14", Corresponding to the 65/35 CTR/TPP Composition, and 28% Degree of Plasticisation Example No. 7 was repeated with the same procedures, but the following quantities of materials were used: 5.04 kg powdered cellulose acetate with a 39.8% degree of acetylation, 1.27 kg acetyl triethyl citrate, 0.69 kg triphenyl phosphate and 3.0 kg solvent.

Comparative Example C5

Laboratory Test No. 13 Corresponding to the Addition of Standard DEP Plasticisers with a 28% Degree of Plasticisation Example No. 7 was repeated with the same procedures, but the following quantities of materials were used: 5.04 kg powdered cellulose acetate with a 39.8% degree of acetylation, 1.96 kg diethyl phthalate citrate and 3.0 kg solvent.

The results of the mechanical characterisation tests carried out on the specimens obtained from the blocks of samples 7-8 and C5 are shown in Table 4 below.

TABLE 4

| Example no. | test block | plasticiser mixture (relative %) | tensile strength ||||| Rockwell hardness R | Charpy impact strength ||||
|---|---|---|---|---|---|---|---|---|---|---|---|
| | | | Stress at yield Mpa | Ultimate tensile stress Mpa | Strain at yield % | Ultimate elongation % | Modulus of elasticity Mpa | | % unbroken % | % <50 KJ/m$^2$ % | minimum value KJ/m$^2$ |
| C5 | 13 | DEP 100 | 29 | 35 | 5.8 | 30 | 1603 | 96 | 10 | 0 | 105 |
| 7 | 12 | CTR 70-TPP 30 | 29 | 39 | 5.9 | 40 | 1346 | 104 | 0 | 0 | 57 |
| 8 | 14 | CTR 65-TPP 35 | 29 | 34 | 6.4 | 25 | 1452 | 104 | 0 | 15 | 37 |

It is clear from the table that the product according to the invention, even when cut from block, has mechanical properties similar to those of the product of the prior art, and also exhibits greater surface hardness.

The plasticiser migration and volatility tests substantially confirmed the results of the tests on the previous samples of material obtained by extrusion.

Extruded Material and Citrate/Trimethyl Trimellitate Plasticiser

Example 9

Laboratory Test No. 66, Corresponding to the 80/20 CTR/TPP Composition, and 28% Degree of Plasticisation In a laboratory mixer 2160 g powdered cellulose acetate with a 39.8% degree of acetylation were mixed with 672 g acetyl triethyl citrate (CTR) and 168 g trimethyl trimellitate. The material was brought up to 60° C. and mixed in the mixer for 3 hours. After cooling at room temperature the mixture was in the form of a free-flowing powder and was passed through a hopper into a single-screw extruder. The extruder jacket was heated to approx. 210° C. and a die with holes 2 mm in diameter was attached at its head. The melted material in the extruder cylinder was expelled from the holes of die at the extruder head in the form of yarns that were cut into pellets, approximately 2 mm long.

Example 10

Laboratory Test No. 37, Corresponding to the 60/40 CTR/TPP Composition, and 28% Degree of Plasticisation Example No. 9 was repeated with the same procedures, but the following quantities of materials were used: 2160 g powdered cellulose acetate with a 39.8% degree of acetylation, 504 g acetyl triethyl citrate and 336 g trimethyl trimellitate.

Example 11

Laboratory Test No. 54, Corresponding to the 60/40 CTR/TPP Composition, and 31% Degree of Plasticisation Example No. 9 was repeated with the same procedures, but the following quantities of materials were used: 2070 g powdered cellulose acetate with a 39.8% degree of acetylation, 558 g acetyl triethyl citrate and 372 g trimethyl trimellitate.

Comparative Example C6

Laboratory Test No. 6, Corresponding to the 50/50 CTR/TPP Composition, and 28% Degree of Plasticisation Example No. 9 was repeated with the same procedures, but the following quantities of materials were used: 2160 g powdered cellulose acetate with a 39.8% degree of acetylation, 420 g acetyl triethyl citrate and 420 g trimethyl trimellitate.

Once specimens were obtained with the same procedures described above for examples 1-6, the mechanical characterisation tests were carried out. The results of the mechanical characterisation tests are shown in Table 5 below.

TABLE 5

| example no. | test extrusion no. | plasticiser | tensile strength ||||| Rockwell hardness R | Charpy impact strength ||||
|---|---|---|---|---|---|---|---|---|---|---|---|
| | | | Stress at yield Mpa | Ultimate tensile stress Mpa | Strain at yield % | Ultimate elongation % | Modulus of elasticity Mpa | | % unbroken % | % <70 KJ/m$^2$ % | minimum value KJ/m$^2$ |
| 9 | 66 | CTR 80-TMTM 20 | 34 | 43 | 4.9 | 33 | 1857 | 120 | 70 | 0 | 74 |
| 10 | 37 | CTR 60-TMTM 40 | 36 | 42 | 4.8 | 24 | 1834 | 114 | 45 | 0 | 181 |
| 11 | 54 | CTR 60-TMTM 40 | 30 | 42 | 4.5 | 45 | 1678 | 107 | 100 | 0 | 186 |
| C6 | 6 | CTR 50-TMTM 50 | 36 | 39 | 5.6 | 16 | 1950 | 110 | 84 | 8 | 6 |

Further tests were carried out to check the level of volatility of the plasticiser and, above all, the extent of migration towards the polycarbonate.

To this end, pellets were produced by the procedures described in example 9 (CTR/TMTM 80/20 with 28% degree of plasticisation) and these were used to extrude slabs of plasticised cellulose acetate from which the specimens were cut for the plasticiser migration test, which was carried out in a similar manner to that described above for the DEP and 65/35 CTR/TPP systems.

Table 6 shows the weights of the specimen of cellulose acetate plasticised with the 80/20 CTR/TMTM composition.

TABLE 6 plasticised AC sandwich from example 9 - CTR/TMTM

| hours | AC specimen g | PC specimen pair g |
|---|---|---|
| 0 | 10.8671 | 5.4395 |
| 24 | 10.8243 | 5.4360 |
| 48 | 10.8093 | 5.4353 |
| 96 | 10.7922 | 5.4358 |
| 216 | 10.7731 | 5.4369 |

Figure 3:
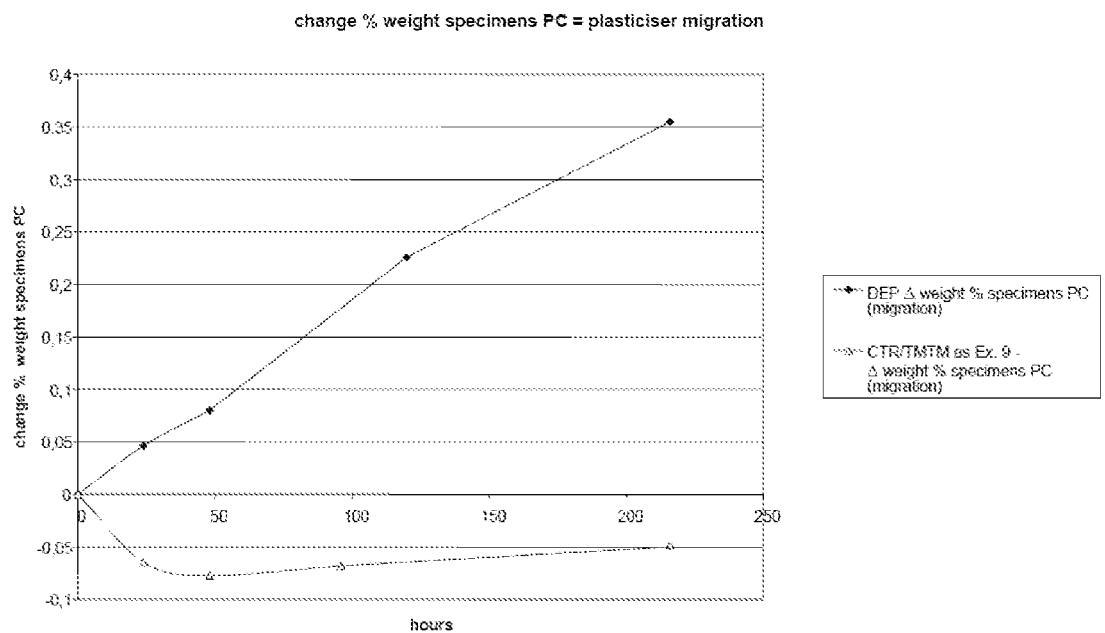
FIG. 3 is a graph showing comparative curves, with DEP plasticiser and CTR/TMTM, of the percentage increase in weight (migration) of a sample of polycarbonate placed in contact with a specimen of cellulose acetate with the addition of plasticiser.

FIG. 3 shows in graph form the percentage change in weight of the specimens of polycarbonate placed in contact with cellulose acetate with the addition of CTR/TMTM, compared with the percentage change in weight to which the specimens with DEP plasticisation were subject.

Figure 4:
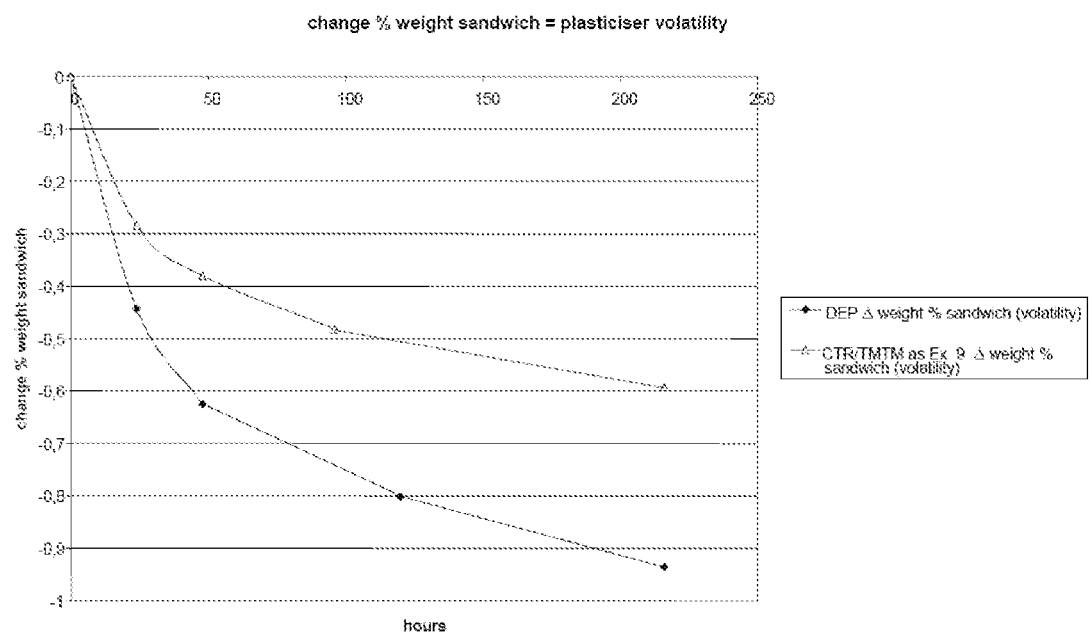
FIG. 4 is a graph showing comparative curves, with DEP plasticiser and CTR/TMTM, of the percentage decrease in weight (volatility) attributable to the evaporation of a plasticiser in a specimen of cellulose acetate with the addition of plasticiser.

FIG. 4 shows as a graph the percentage losses in weight owing to the evaporation of the plasticiser on the same types of specimen.

It is found, therefore, that the CTR/TMTM plasticiser also has a performance similar to the CTR/TPP one, confirming the excellent performance of the material according to the invention compared with its use in combination or in contact with polycarbonate and the small loss in weight by evaporation, compared with the plasticised product according to the known art (i.e. with the DEP plasticiser).

Material Cut from Block and Citrate/Trimethyl Trimellitate Plasticiser

Example 12

Laboratory Test "Block 7", Corresponding to the 67/33 CTR/TPP Composition, and 30% Degree of Plasticisation In a laboratory mixer, 4.90 kg powdered cellulose acetate with a 39.8% degree of acetylation were mixed with 1.40 kg acetyl triethyl citrate, 0.70 kg trimethyl trimellitate and 3.0 kg solvent. The material was brought up to approx. 100° C. and mixed in the mixer for ½ hour. The paste obtained thereby was shaped into a block approx. 20×40 cm in section, in a press heated to 90° C. After cooling, the block was cut into slabs 6 mm thick, which were then dried to eliminate substantially all the solvent. The specimens for the mechanical characterisation were cut directly from the slabs obtained, in a similar manner to that indicated for the preceding mechanical tests.

Example 13

Laboratory Test "Block 16", Corresponding to the 67/33 CTR/TPP Composition, and 28% Degree of Plasticisation Example No. 12 was repeated with the same procedures, but the following quantities of materials were used: 5.04 kg powdered cellulose acetate with a 39.8% degree of acetylation, 1.31 kg acetyl triethyl citrate, 0.65 kg trimethyl trimellitate and 3.0 kg solvent.

Example 14

Laboratory Test "Block 17", Corresponding to the 60/40 CTR/TMTM Composition, and 28% Degree of Plasticisation Example No. 12 was repeated with the same procedures, but the following quantities of materials were used: 5.04 kg powdered cellulose acetate with a 39.8% degree of acetylation, 1.18 kg acetyl triethyl citrate, 0.78 kg trimethyl trimellitate and 3.0 kg solvent.

The results of the mechanical characterisation on the specimens indicated above are shown in Table 7 below.

TABLE 7

| example no. | test block no. | plasticiser | tensile strength | | | | Modulus of elasticity Mpa | Rockwell hardness R | Charpy impact strength | | |
|---|---|---|---|---|---|---|---|---|---|---|---|
| | | | Stress at yield Mpa | Ultimate tensile stress Mpa | Strain at yield % | Ultimate elongation % | | | % unbroken % | % <50 KJ/m² % | minimum value KJ/m² |
| 12 | 7 | CTR 67-TMTM 33 (plast. 30%) | 26 | 38 | 5.5 | 46 | 1345 | 97 | 0 | 0 | 66 |
| 13 | 16 | CTR 67-TMTM 33 | 21 | 29 | 4.3 | 37 | 1235 | 88 | 0 | 15 | 43 |
| 14 | 17 | CTR 60-TMTM 40 | 19 | 26 | 4.1 | 34 | 1274 | 87 | 0 | 10 | 37 |

Further tests were carried out to check the level of volatility of the plasticiser and, above all, the extent of migration towards the polycarbonate. The results were substantially equivalent to the previous ones, obtained for extruded product.

The product based on plasticised cellulose acetate as described above proved optimal in the desired field of application, thus allowing the aims set out in the preamble to be fully achieved.

The mixture of plasticisers selected for cellulose acetate makes it possible to produce manufactured articles, in particular frames and other components for spectacles, having mechanical properties at least equivalent to those obtained with known plasticisers and it has the following additional advantages:

an article made with the product of the invention and placed in contact with polycarbonate does not exhibit any migration of the plasticiser; therefore, no opacification of the polycarbonate occurs and/or no cracks form; this makes it possible, for example, to use polycarbonate lenses with the spectacle frames produced with this product based on cellulose acetate;

the mixture of plasticisers selected in this way is less volatile than the plasticisers normally used: the loss of plasticiser over time is less and this gives the manufactured article a longer life;

an article made using the product of the invention:
- has a greater surface hardness and therefore the surface machining (for example tumbling of the spectacles) proves easier and the finished article is less subject to scoring;
- keeps its shape better over time, thus preventing any loss of stability and efficacy of use, in the case of a spectacle frame.

Finally, the right compromise between quantity of the main plasticiser component (citrate) and the second component prevents the generic yellow colouring of the (industrial grade) citrates from affecting the final colour of the manufactured article.

It is in any case understood that the invention should not be limited to the particular configurations illustrated above, which simply are some non-exhaustive examples of the scope of the invention, whereas numerous variants are possible, all within the ability of a person skilled in the art, without thereby leaving the scope of protection of said invention.

For example, although reference is always made in the specification to the use of the plastic material in the field of eyewear and jewelry, this does not exclude the same material from being applied advantageously in other sectors, where it is important to avoid migration of the plasticiser, for example close to electronic components.

The invention claimed is:

1. Plastic material based on cellulose acetate, comprising at least one plasticizer, said plasticizer is comprised of the mixture of a first plasticizer comprised of citric acid esters with at least one second plasticizer, the content of the first plasticizer being equal to or greater than the second plasticizer and the aforementioned mixture of plasticizers constituting overall 25-35% by weight of said plastic material, characterized in that said first plasticizer amounts to 60-70% by weight and said second plasticizer is an organic phosphate amounting to 40-30% by weight.

2. Plastic material as in claim 1, in which said first plasticizer is acetyl triethyl citrate (CTR).

3. Plastic material as in claim 2, in which said second plasticizer is chosen from triaryl phosphate, alkyl diaryl phosphate, triphenyl phosphate, ethylhexyl diphenyl phosphate and isodecyl diphenyl phosphate, and is preferably triphenyl phosphate (TPP).

4. Spectacle frame comprising, at least in part, a material based on cellulose acetate with plasticizers, characterized in that said material based on cellulose acetate with plasticizers is a plastic material according to claim 2.

5. Spectacles comprising a frame as in claim 4 and lenses made of a polycarbonate-based material.

6. Lenses for spectacles or face-guards comprising, at least in part, a material based on cellulose acetate with plasticizers, characterized in that said material based on cellulose acetate with plasticizers is a plastic material according to claim 2.

7. Support plate or cover for a device containing electronic components, characterized in that it consists of a plastic material as in claim 2.

8. Plastic material as in claim 1, in which said second plasticizer is chosen from triaryl phosphate, alkyl diaryl phosphate, triphenyl phosphate, ethylhexyl diphenyl phosphate and isodecyl diphenyl phosphate, and is preferably triphenyl phosphate (TPP).

9. Spectacle frame comprising, at least in part, a material based on cellulose acetate with plasticizers, characterized in that said material based on cellulose acetate with plasticizers is a plastic material according to claim 8.

10. Spectacles comprising a frame as in claim 9 and lenses made of a polycarbonate-based material.

11. Lenses for spectacles or face-guards comprising, at least in part, a material based on cellulose acetate with plasticizers, characterized in that said material based on cellulose acetate with plasticizers is a plastic material according to claim 8.

12. Support plate or cover for a device containing electronic components, characterized in that it consists of a plastic material as in claim 8.

13. Spectacle frame comprising, at least in part, a material based on cellulose acetate with plasticizers, characterized in that said material based on cellulose acetate with plasticizers is a plastic material according to claim 1.

14. Spectacles comprising a frame as in claim 13 and lenses made of a polycarbonate-based material.

15. Lenses for spectacles or face-guards comprising, at least in part, a material based on cellulose acetate with plasticizers, characterized in that said material based on cellulose acetate with plasticizers is a plastic material according to claim 1.

16. Support plate or cover for a device containing electronic components, characterized in that it consists of a plastic material as in claim 1.

* * * * *